(12) United States Patent
Ma et al.

(10) Patent No.: US 10,510,378 B1
(45) Date of Patent: Dec. 17, 2019

(54) SLIT FULL DISK SHROUD

(71) Applicant: Seagate Technology LLC, Cupertino, CA (US)

(72) Inventors: YiChao Ma, Singapore (SG); Xiong Liu, Singapore (SG); Li Hong Zhang, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/198,467

(22) Filed: Nov. 21, 2018

(51) Int. Cl.
 *G11B 33/02* (2006.01)

(52) U.S. Cl.
 CPC ................. *G11B 33/022* (2013.01)

(58) Field of Classification Search
 CPC .................................................. G11B 33/022
 USPC ....................................................... 360/97.14
 See application file for complete search history.

(56) References Cited

U.S. PATENT DOCUMENTS

| | | | |
|---|---|---|---|
| 8,009,384 B1 | 8/2011 | Little | |
| 8,077,429 B2 | 12/2011 | Eguchi | |
| 8,102,618 B2 | 1/2012 | Chan et al. | |
| 8,199,426 B2 | 6/2012 | Hendriks | |
| 8,711,513 B1* | 4/2014 | Toukairin | G11B 33/148 360/97.14 |
| 2002/0015255 A1* | 2/2002 | Tadepalli | G11B 5/6005 360/97.14 |
| 2005/0185324 A1* | 8/2005 | Suwa | G11B 5/6005 360/97.14 |
| 2005/0185327 A1* | 8/2005 | Voights | G11B 33/1446 360/97.14 |
| 2005/0270691 A1* | 12/2005 | Pottebaum | G11B 5/6005 360/97.14 |
| 2007/0188914 A1* | 8/2007 | Gross | G11B 5/6005 360/97.14 |
| 2008/0068746 A1* | 3/2008 | Kaneko | G11B 25/043 360/97.14 |
| 2008/0100957 A1* | 5/2008 | Gross | G11B 25/043 360/97.14 |
| 2009/0073607 A1* | 3/2009 | Yu | G11B 25/043 360/97.14 |
| 2009/0237836 A1* | 9/2009 | Hendriks | G11B 5/6005 360/97.14 |
| 2009/0241322 A1* | 10/2009 | Uefune | G11B 25/043 29/603.01 |
| 2010/0027160 A1* | 2/2010 | Murakami | G11B 5/41 360/97.14 |
| 2010/0157469 A1* | 6/2010 | Ichikawa | G11B 33/148 360/97.14 |
| 2010/0246059 A1* | 9/2010 | Shimizu | G11B 5/6005 360/97.14 |
| 2017/0103785 A1* | 4/2017 | Jabbari | G11B 33/146 |

\* cited by examiner

*Primary Examiner* — Allen T Cao

(57) ABSTRACT

Provided herein is an apparatus including a hard drive base. A number of disks are rotatably connected to the hard drive base, and there are a number of disk gaps between the disks. A shroud extends in a circumferential span around the disks, wherein the shroud extends less than the circumference of the disks. The shroud is positioned between the disk gaps and an upwardly sloping gas channel. A number of arcuate gas channels are in the shroud, wherein each arcuate gas channel is horizontally aligned with a corresponding disk gap. The arcuate gas channels connect the disk gaps to the upwardly sloping gas channel.

20 Claims, 5 Drawing Sheets

SLIT FULL DISK SHROUD

SUMMARY

Provided herein is an apparatus including a hard drive base. A number of disks are rotatably connected to the hard drive base, and there are a number of disk gaps between the disks. A shroud extends in a circumferential span around the disks, wherein the shroud extends less than the circumference of the disks. The shroud is positioned between the disk gaps and an upwardly sloping gas channel. A number of arcuate gas channels are in the shroud, wherein each arcuate gas channel is horizontally aligned with a corresponding disk gap. The arcuate gas channels connect the disk gaps to the upwardly sloping gas channel. These and other features and advantages will be apparent from a reading of the following detailed description.

DESCRIPTION

Figure 1:
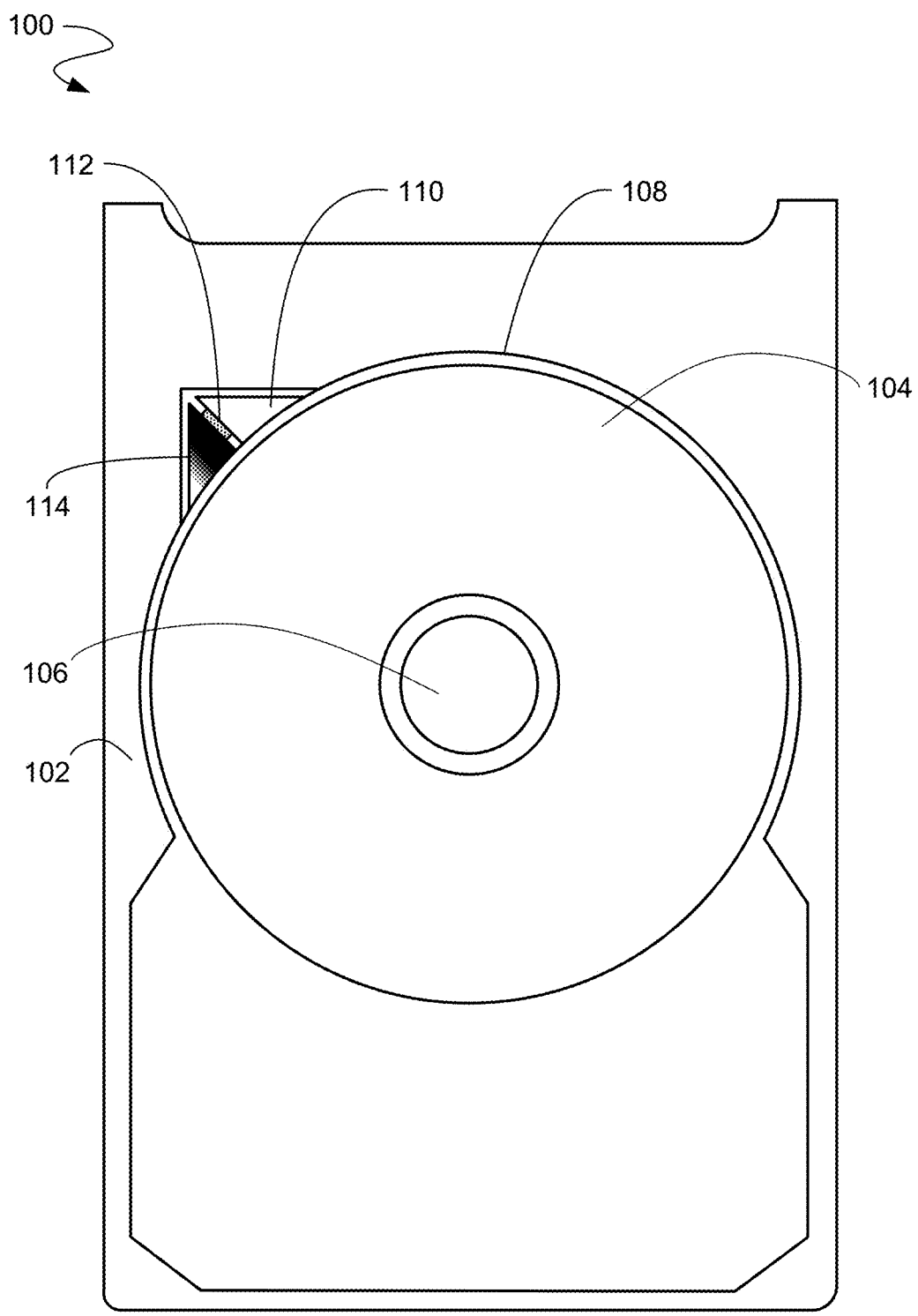
FIG. 1 shows a simplified view of a hard drive according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

The disks in a hard drive, commonly referred to as hard drive media, are becoming thinner and larger. As a result, the detrimental effects of disk flutter become an increasing problem. For example, disk flutter negatively impacts track media registration ("TMR"). In order to reduce disk flutter, a full disk shroud may be added to the hard drive. The full disk shroud continuously encircles most of the disks, leaving an opening for the actuator arms. The full disk shroud reduces disk flutter by reducing air turbulence or airflow on the disks at the expense of air filter efficiency because the full disk shroud requires the air filter to be relocated to a low airflow place in the hard drive. As such, air filter efficiency is sacrificed in order to reduce disk flutter.

Embodiments described herein maintain air filter efficiency, as well as maintain the continuous form of the full disk shroud. The air filter (e.g. gas filter, recirculation filter, R-Filter, etc.) is positioned behind the full disk shroud, in a region of high airflow between the full disk shroud and the disks. In order to maintain the continuous form of the full disk shroud and allow the air to reach the filter behind the disk shroud, slits are formed into the disk shroud and aligned in the gaps between individual disks. The slits allow the air (e.g. gas) to travel from the region of high airflow between the disks and the shroud, through the shroud, and then through the filter. The slits are horizontally formed in the shroud, without introducing a break in the shroud (e.g. causing the shroud to be separated into discrete separate sections). As such, the continuous form of the disk shroud is maintained, thereby reducing air turbulence and disk flutter.

Referring now to FIG. 1, a simplified view of a hard drive 100 is shown according to one aspect of the present embodiments. The hard drive 100 includes a base 102 and media 104. The media 104 are rotatably connected to the base 102 through a spindle motor 106. In various embodiments the media 104 may be a single disk or a number of disks (e.g. a disk pack). A disk shroud 108 extends in a circumferential span around the media 104. The disk shroud 108 is complimentary in shape to the media 104.

The disk shroud's complimentary annular shape to the media 104 forms a single continuous unit without breaks (e.g. a full disk shroud). The disk shroud 108 closely follows an external contour of the outer rim of the media 104. The disk shroud 108 includes a generally cylindrical transverse surface extending in the axial direction of the media 104 that flatly faces the outer rim of the media 104. Therefore, the transverse surface of the disk shroud 108 is substantially perpendicular to a planar orientation of the media 104. In order to allow for an actuator arm to pivot into a position with respect to the media 104 (not shown but see FIG. 6), the disk shroud 108 extends less than the circumference of the media 104 (e.g. less than 360 degrees). For example, the disk shroud 108 may extend greater than 50% (e.g. 180 degrees) of the circumference of the media 104 up to 85% (e.g. 306 degrees) of the circumference of the media 104. In various embodiments, the disk shroud 108 is horizontally positioned less than 1.0 mm from the media 104, and the disk shroud 108 may be formed as part of the base 102 or attached to the base 102 as a separate component.

A gas chamber 110, a filter 112 (e.g. gas filter, air filter, etc.), and an upwardly sloping gas channel 114 are positioned on the opposite side of the disk shroud 108 from the media 104. As such, disk shroud 108 is positioned between the media 104 and the gas chamber 110, the filter 112, and the upwardly sloping gas channel 114. This arrangement channels a high volume of gas (e.g. air) that flows from a region surrounding the media 104, through slits (not shown but see FIG. 2) in the disk shroud 108, and into the gas chamber 110. The gas then flows from the gas chamber 110, through the filter 112 (which removes contaminants), and into the upwardly sloping gas channel 114. As such, the gas chamber 110, the filter 112, and the upwardly sloping gas channel 114 are fluidly connected together.

Figure 2:
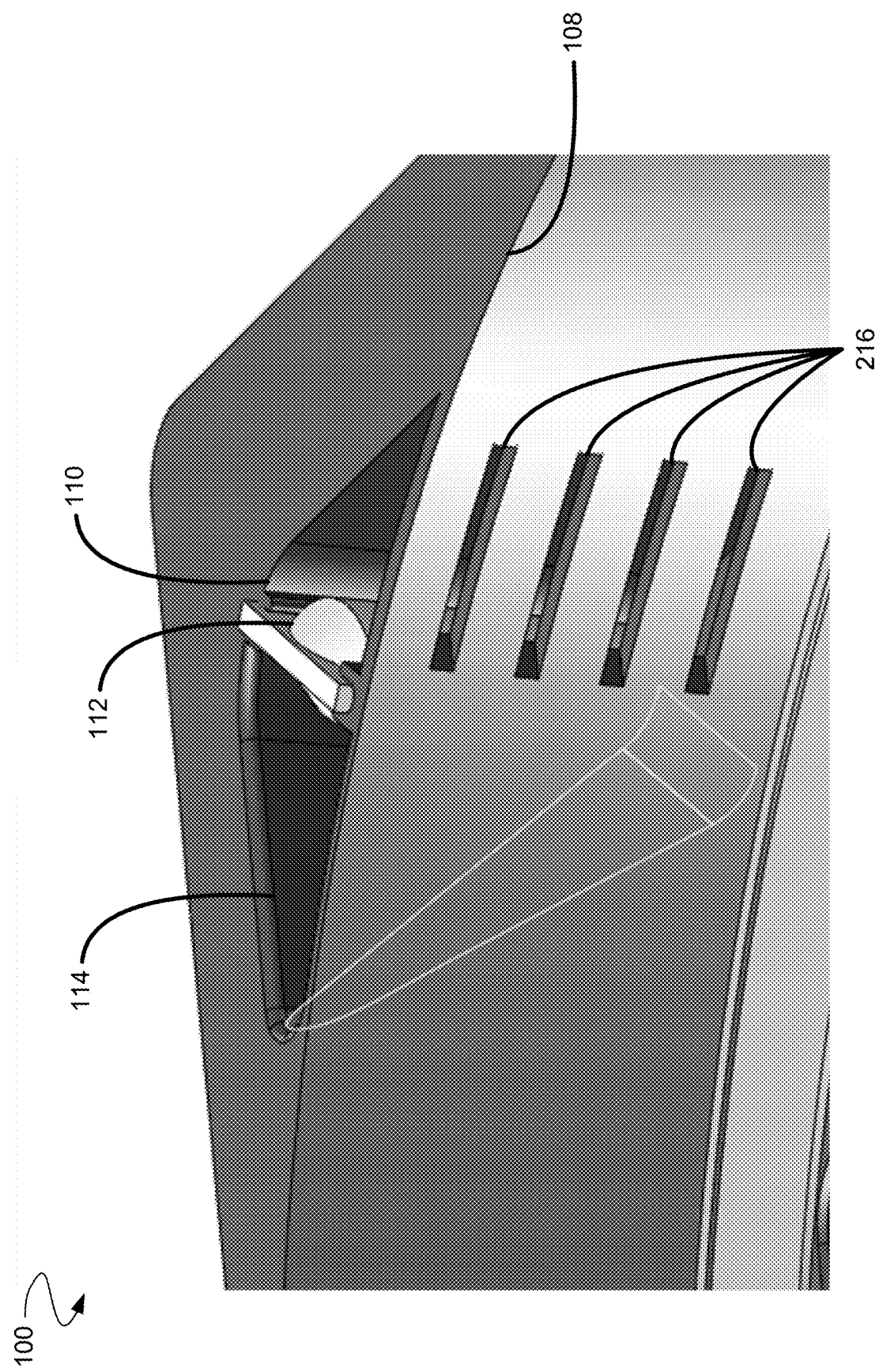
FIG. 2 shows a side view of a disk shroud, a gas chamber, a filter, and an upwardly sloping gas channel according to one aspect of the present embodiments.

Referring now to FIG. 2, a side view of the disk shroud 108, the gas chamber 110, the filter 112, and the upwardly sloping gas channel 114 is shown according to one aspect of the present embodiments. According to embodiments described herein, slits 216 are formed in the disk shroud 108. The slits 216 are arcuate gas channels formed through the disk shroud 108 and fluidly connected to the gas chamber 110, the filter 112, and the upwardly sloping gas channel 114. The slits 216 allow gas to flow through the disk shroud 108, while maintaining the continuity of the disk shroud 108 as a continuous circumferential unitary spanning component of the hard drive 100.

As a result of the slits 216 tracing the curvature of the disk shroud 108, the airflow around the media 104 (FIG. 1) is not broken abruptly in the region around the filter 112. Instead, the airflow is smoothly channeled into the filter 112. As such, turbulence is reduced in the region, leading to reduced disk flutter and improved TMR.

Therefore, according to embodiments described herein, gas flows through the slits 216 and into gas chamber 110. The gas then flows from the gas chamber 110, through the filter 112, and into the upwardly sloping gas channel 114. The upwardly sloping gas channel 114 directs the gas into a gas duct (not shown but see FIG. 4) formed in a hard drive top cover (not shown but see FIG. 4). It is understood that in some embodiments the gas chamber 110 and/or the upwardly sloping gas channel 114 may be omitted and not included in the hard drive 100. For example, in an embodiment without the gas chamber 110, the gas would flow through the slits 216, into the filter 112, and then into the upwardly sloping gas channel 114.

Figure 3:
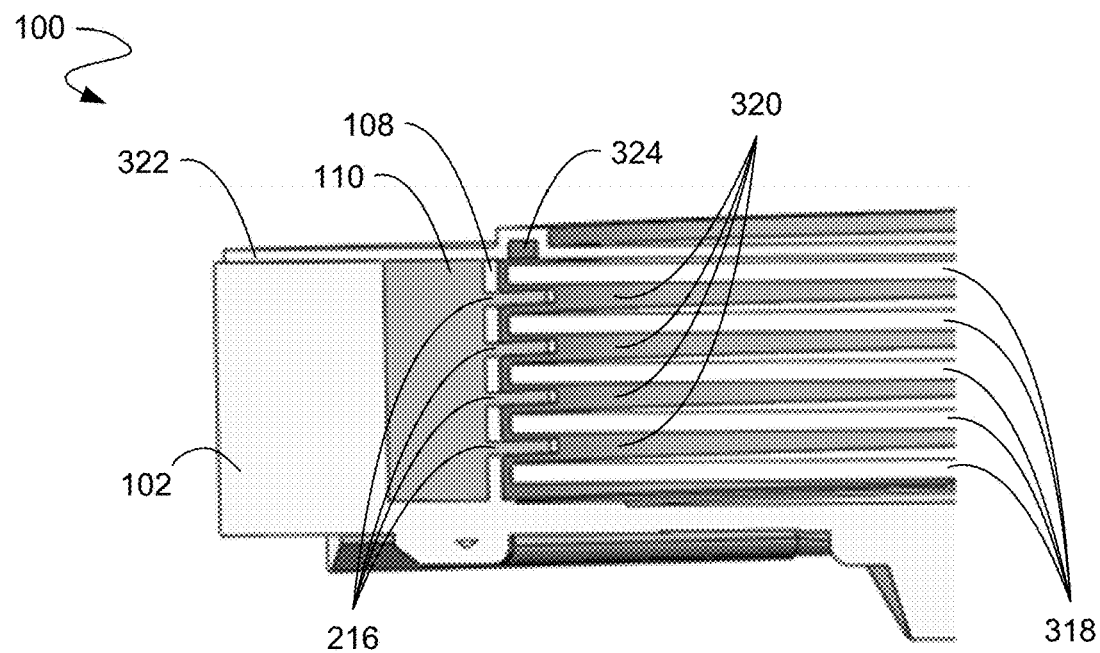
FIG. 3 shows a side view of the gas chamber and slits according to one aspect of the present embodiments.

Referring now to FIG. 3, a side view of the gas chamber 110 and the slits 216 is shown according to one aspect of the present embodiments. As previously discussed, the media 104 (FIG. 1) may include one or more disks 318. When the hard drive 100 (FIG. 1) includes a number of disks 318, they may also be referred to as a disk pack. The disks 318 are separated, forming a number of gaps 320 between each of the disks 318.

The shroud 108 separates the disks 318 and the gaps 320 from the gas chamber 110 that is directly connected to the upwardly sloping gas channel 114 (FIG. 1). As previously discussed, the slits 216 are arcuate gas channels that connect the gaps 320 to the upwardly sloping gas channel 114 (FIG. 1) through the gas chamber 110.

In various embodiments, the size, total number, and locations of the slits 216 in the disk shroud 108 may be optimized and determined based on airflow modeling to minimize disk flutter and maximize the efficiency of the filter 112 (FIG. 1). For example, in the illustrated embodiment, each of the slits 216 is vertically stacked, and each of the slits 216 is horizontally aligned with a corresponding gap 320, and each of the gaps 320 has a corresponding slit 216. However, in other embodiments, there may be fewer number of slits 216. In such embodiments, some of the gaps 320 may have a corresponding slit 216 and some may not. In further embodiments, the slits 216 may be aligned with other elements and/or components of the hard drive 100. For example, the slits 216 may be aligned with one or more of the disks 318. In a further example, one or more of the slits 216 may be aligned with the slits 216 and one or more other slits 216 may be aligned with one or more of the disks 318. As such, any number of slits may be aligned and positioned in any manner in order to optimize the flow of gas.

A top cover 322 is attached to the base 102. The top cover 322 and the base 102 enclose and seal the hard drive components within the base 102 (including, but not limited to, those previously discussed). The top cover 322 also includes a gas duct 324, that will be discussed in greater detail below.

Figure 4:
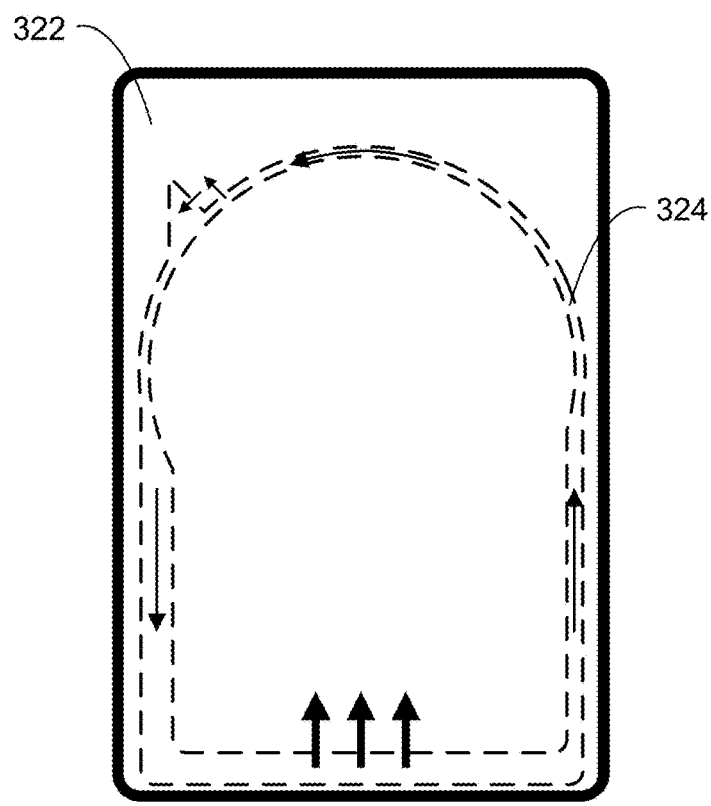
FIG. 4 shows a top view of the top cover including the gas duct according to one aspect of the present embodiments.

Referring now to FIG. 4, a top view of the top cover 322 including the gas duct 324 is shown according to one aspect of the present embodiments. The gas duct 324 is formed in the underside of the top cover 322 and directs the flow of gas as the disks 318 (FIG. 3) rotate. In the illustrated embodiments, the disks 318 (FIG. 3) rotate in a counterclockwise direction. However, it is understood that the hard drive 100 (FIG. 1) could be reconfigured (not shown) for a clockwise rotation. The flow of gas is illustrated by the arrows, mirroring the rotation of the disks 318 (FIG. 3).

The arrows in FIG. 4 illustrate a counterclockwise flow of gas through the gas duct 324. Following the arrows, the gas enters the gas chamber 110 (FIG. 1), passes through the filter 112 (FIG. 1), and into the upwardly sloping gas channel 114 (FIG. 1). The upwardly sloping gas channel 114 (FIG. 1) connects to the gas duct 324. The gas duct 324 directs the gas through the top cover 322 around the periphery of the hard drive 100 (FIG. 1). In various embodiments, the gas duct 324 extends along the circumferential span of the disk shroud 108 (FIG. 1) and the upwardly sloping gas channel 114 (FIG. 1).

The gas duct 324 extends from the upwardly sloping gas channel 114 (FIG. 1), returning the gas to the base 102 (FIG. 1) at a location in the base 102 (FIG. 1) away from the disks 318 (FIG. 3). For example, the gas duct 324 may return the gas to the base 102 (FIG. 1) in one or more locations along the bottom of the top cover 322 (illustrated by the three thicker parallel arrows), near the voice coil motor (not shown but see FIG. 6), the control electronics (not shown but see FIG. 6), or other hard drive component(s).

In some embodiments, some of the gas continues to circulate in the gas duct 324 along the periphery of the hard drive 100 (FIG. 1). In such embodiments, the gas duct 324 forms a complete loop around the hard drive 100 (FIG. 1). A portion of the gas is returned to the base 102 (FIG. 1) at one or more locations away from the disks 318 (FIG. 3), and another portion of the gas continues to circulate in a counterclockwise path within the gas duct 324.

In other embodiments (not shown), all of the gas is returned to the base 102 (FIG. 1). In such embodiments, the gas enters the gas duct 324 at the upwardly sloping gas channel 114 (FIG. 1), and all of the gas in the gas duct 324 exits the gas duct 324 at one or more locations away from the disks 318 (FIG. 3).

Figure 5:
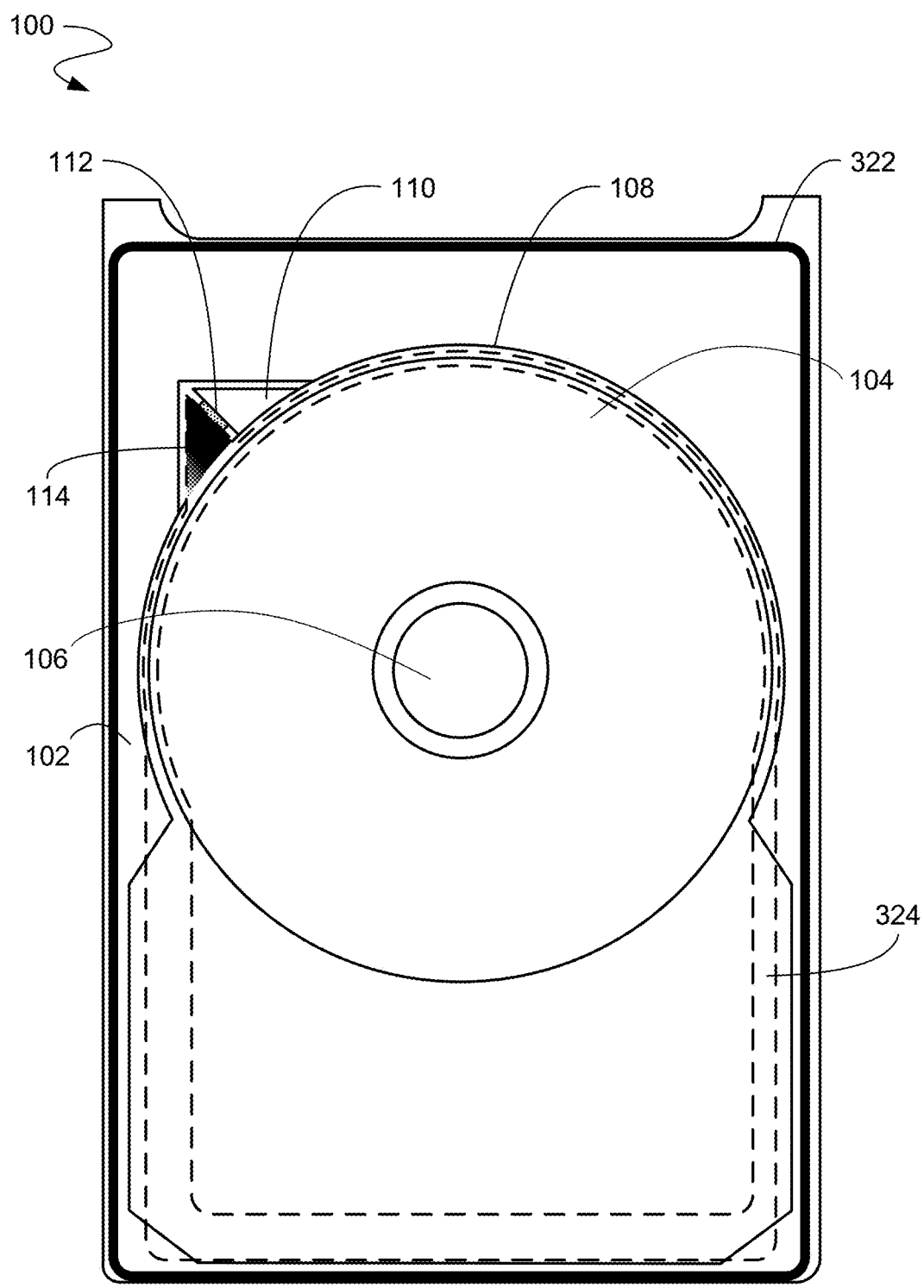
FIG. 5 shows a top view of the hard drive including the top cover according to one aspect of the present embodiments.

Referring now to FIG. 5, a top view of the hard drive 100 including the top cover 322 is shown according to one aspect of the present embodiments. For clarity of illustration, the underlying components in the base 102 are illustrated with solid lines. It is understood that the top cover 322 overlies the base 102 as well as the components in the base 102. For example, the top cover 322 overlies the gas chamber 110, the filter 122, and the upwardly sloping gas channel 114.

The top cover 322 is attached and secured to the hard drive 100 using one or more fasteners (not shown, e.g. screws, rivets, weld, glue, etc.). In various embodiments, the top cover 322 is in overlying contact with the gas chamber 110, the upwardly sloping gas channel 114, and other components of the hard drive 100. As such, the top cover 322 isolates the gas chamber 110 from the gas duct 324, thereby channeling the circulation of the gas through the filter 122 and the upwardly sloping gas channel 114.

Figure 6:
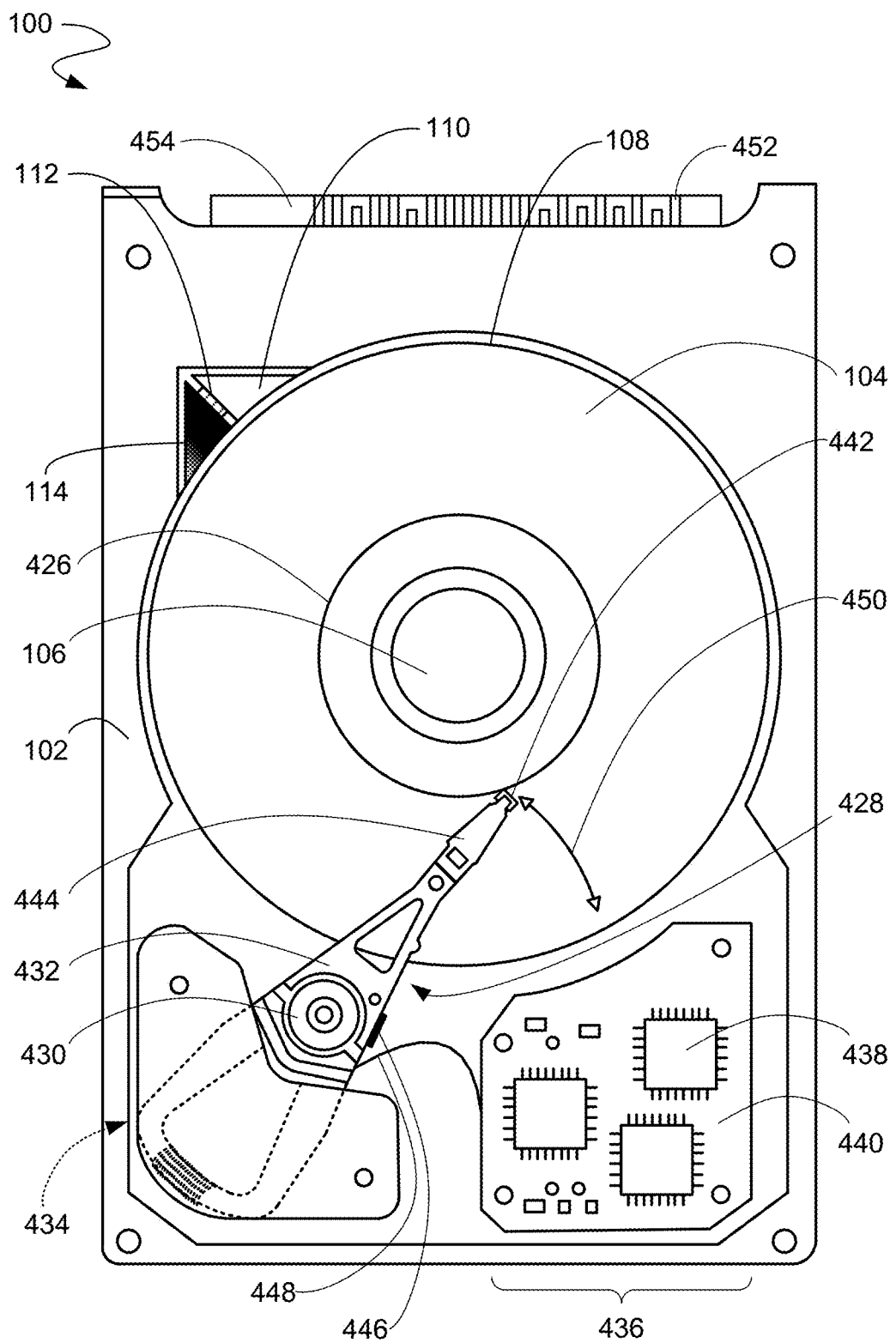
FIG. 6 shows a top view of the hard drive including a number of components and without the top cover according to one aspect of the present embodiments.

Referring now to FIG. 6, a top view of the hard drive 100 including a number of components and without the top cover 322 (FIG. 3) is shown according to one aspect of the present embodiments. As previously discussed, the hard drive 100 generally includes the base 102 and the top cover 322 (FIG. 3) that is disposed on the base 102 to define an enclosed housing for various disk drive components. The disk drive 100 includes one or more data storage disks of computer-readable data storage media 104. Typically, both of the major surfaces of each data storage disk include a plurality of concentrically disposed tracks for data storage purposes. Each data storage disk is mounted on a hub 426, which in turn is rotatably interconnected with the base 102 and/or top cover 322 (FIG. 3). Multiple data storage disks are typically mounted in vertically spaced and parallel relation on the hub 426. The spindle motor 106 rotates the data storage disks.

The disk drive 100 also includes an actuator arm assembly 428 that pivots about a pivot bearing 430, which in turn is rotatably supported by the base 102 and/or top cover 322 (FIG. 3). The actuator arm assembly 428 includes one or more individual rigid actuator arms 432 that extend out from near the pivot bearing 430. Multiple actuator arms 432 are typically disposed in vertically spaced relation, with one actuator arm 432 being provided for each major data storage surface of each data storage disk of the disk drive 100. Other types of actuator arm assembly configurations could be utilized as well, an example being an "E" block having one or more rigid actuator arm tips, or the like, that cantilever from a common structure. Movement of the actuator arm assembly 428 is provided by an actuator arm drive assembly, such as a voice coil motor 434 or the like. The voice coil motor 434 is a magnetic assembly that controls the operation of the actuator arm assembly 428 under the direction of control electronics 436.

The control electronics 436 may include a plurality of integrated circuits 438 coupled to a printed circuit board 440. The control electronics 436 may be coupled to the voice coil motor assembly 428, a slider 442, or the spindle motor 106 using interconnects that can include pins, cables, or wires (not shown).

A load beam or suspension 444 is attached to the free end of each actuator arm 432 and cantilevers therefrom. Typically, the suspension 444 is biased generally toward its corresponding data storage disk by a spring-like force. The slider 442 is disposed at or near the free end of each suspension 444. What is commonly referred to as the read/write head (e.g., transducer) is appropriately mounted as a head unit (not shown) under the slider 442 and is used in disk drive read/write operations. The head unit under the slider 442 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 442 is connected to a preamplifier 446, which is interconnected with the control electronics 436 of the disk drive 100 by a flex cable 448 that is typically mounted on the actuator arm assembly 428. Signals are exchanged between the head unit and its corresponding data storage disk for disk drive read/write operations. In this regard, the voice coil motor 434 is utilized to pivot the actuator arm assembly 428 to simultaneously move the slider 442 along a path 450 and across the corresponding data storage disk to position the head unit at the appropriate position on the data storage disk for disk drive read/write operations.

When the disk drive 100 is not in operation, the actuator arm assembly 428 is pivoted to a "parked position" to dispose each slider 442 generally at or beyond a perimeter of its corresponding data storage disk, but in any case in vertically spaced relation to its corresponding data storage disk. In this regard, the disk drive 100 includes a ramp assembly (not shown) that is disposed beyond a perimeter of the data storage disk to both move the corresponding slider 442 vertically away from its corresponding data storage disk and to also exert somewhat of a retaining force on the actuator arm assembly 428.

Exposed contacts 452 of a drive connector 454 along a side end of the disk drive 100 may be used to provide connectivity between circuitry of the disk drive 100 and a next level of integration such as an interposer, a circuit board, a cable connector, or an electronic assembly. The drive connector 454 may include jumpers (not shown) or switches (not shown) that may be used to configure the disk drive 100 for user specific features or configurations. The jumpers or switches may be recessed and exposed from within the drive connector 454.

As such, an embodiment described herein includes a hard drive base. A number of disks are rotatably connected to the hard drive base, and there are a number of disk gaps between the disks. A shroud extends in a circumferential span around the disks, wherein the shroud extends less than the circumference of the disks. A number of arcuate gas channels are in the shroud, wherein each arcuate gas channel is horizontally aligned with a corresponding disk gap. The shroud is positioned between the disk gaps and the upwardly sloping gas channel, and the arcuate gas channels connect the disk gaps to the upwardly sloping gas channel. As such, the shroud functions as an air flow control device and a vibration suppressing mechanism.

Some embodiments may include a gas duct in a hard drive top cover attached to the hard drive base. The gas duct extends from the upwardly sloping gas channel to a location in the hard drive base away from the disks. A filter may be positioned between the arcuate gas channels and the upwardly sloping gas channel.

Some embodiments may include a gas chamber positioned between the arcuate gas channels and the upwardly sloping gas channel, as well as a filter positioned between the gas chamber and the upwardly sloping gas channel. Further embodiments may include a gas duct in a hard drive top cover attached to the hard drive base, wherein the gas duct extends along the circumferential span of the shroud and the upwardly sloping gas channel. The hard drive top cover isolates the gas chamber from the gas duct.

Another embodiment described herein includes a gas chamber. A sloping gas channel is directly connected to the gas chamber. A filter separates the gas chamber from the sloping gas channel. A number of arcuate gas channels are vertically stacked and horizontally aligned with a number of gaps between a number of hard drive disks, wherein the arcuate gas channels are positioned between the gas chamber and the hard drive disks.

Some embodiments may include a gas duct extending from the sloping gas channel to a location away from the plurality of hard drive disks. A hard drive top cover overlies the gas chamber and the sloping gas channel, wherein the hard drive top cover includes the gas duct. In various embodiments a shroud includes the arcuate gas channels. The shroud is complimentary in shape to the hard drive disks and extends less than 360 degrees around the hard drive disks.

Another embodiment described herein includes a shroud extending in a circumferential span around a disk pack, wherein the shroud extends less than the circumference of the disk pack. A number of arcuate gas channels are in the shroud, wherein each arcuate gas channel is horizontally aligned between corresponding pairs of disks in the disk pack. The shroud is positioned between a gas chamber and the disk pack. An upwardly sloping gas channel is fluidly connected to the gas chamber, and the gas chamber is fluidly connected to the arcuate gas channels.

In some embodiments the disk pack is rotatably connected to a hard drive base, and a hard drive top cover including a gas duct is attached to the hard drive base. The gas duct extends from the upwardly sloping gas channel to a location in the hard drive base away from the plurality of disks. A filter is positioned between the gas chamber and the upwardly sloping gas channel.

In some embodiments the shroud is positioned less than 1.0 mm from the disk pack. A hard drive top cover is in overlying contact with the gas chamber and the upwardly sloping gas channel. A gas duct is in the hard drive top cover, wherein the gas duct extends along the circumferential span of the shroud and the upwardly sloping gas channel. The hard drive top cover isolates the gas chamber from the gas duct.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
a hard drive base;
a plurality of disks rotatably connected to the hard drive base;
a plurality of disk gaps between the plurality of disks;
a shroud extending in a circumferential span around the plurality of disks, wherein the shroud extends less than the circumference of the plurality of disks;
a plurality of arcuate gas channels in the shroud, wherein each arcuate gas channel of the plurality of arcuate gas channels is horizontally aligned with a corresponding disk gap of the plurality of disk gaps; and
an upwardly sloping gas channel, wherein
the shroud is positioned between the plurality of disk gaps and the upwardly sloping gas channel, and
the arcuate gas channels connect the disk gaps to the upwardly sloping gas channel.

2. The apparatus of claim 1, further comprising a gas duct in a hard drive top cover attached to the hard drive base.

3. The apparatus of claim 2, wherein the gas duct extends from the upwardly sloping gas channel to a location in the hard drive base away from the plurality of disks.

4. The apparatus of claim 1, further comprising a filter positioned between the arcuate gas channels and the upwardly sloping gas channel.

5. The apparatus of claim 1, further comprising
a gas chamber positioned between the arcuate gas channels and the upwardly sloping gas channel; and
a filter positioned between the gas chamber and the upwardly sloping gas channel.

6. The apparatus of claim 5, further comprising a gas duct in a hard drive top cover attached to the hard drive base, wherein the gas duct extends along the circumferential span of the shroud and the upwardly sloping gas channel.

7. The apparatus of claim 6, wherein the hard drive top cover isolates the gas chamber from the gas duct.

8. An apparatus comprising:
a gas chamber;
a sloping gas channel connected to the gas chamber;
a filter separating the gas chamber from the sloping gas channel; and
a plurality of arcuate gas channels that are vertically stacked and horizontally aligned with a plurality of gaps between a plurality of hard drive disks, wherein the plurality of arcuate gas channels is positioned between the gas chamber and the plurality of hard drive disks.

9. The apparatus of claim 8, further comprising a gas duct extending from the sloping gas channel to a location away from the plurality of hard drive disks.

10. The apparatus of claim 9, further comprising a hard drive top cover overlying the gas chamber and the sloping gas channel, wherein the hard drive top cover includes the gas duct.

11. The apparatus of claim 8, further comprising a shroud, wherein the shroud includes the plurality of arcuate gas channels.

12. The apparatus of claim 11, wherein the shroud is complimentary in shape to the plurality of hard drive disks.

13. The apparatus of claim 11, wherein the shroud extends less than 360 degrees around the plurality of hard drive disks.

14. An apparatus comprising:
a shroud extending in a circumferential span around a disk pack, wherein the shroud extends less than the circumference of the disk pack;
a plurality of arcuate gas channels in the shroud, wherein each arcuate gas channel of the plurality of arcuate gas channels is horizontally aligned between corresponding pairs of disks in the disk pack;
a gas chamber, wherein the shroud is positioned between the gas chamber and the disk pack; and
an upwardly sloping gas channel connected to the gas chamber.

15. The apparatus of claim 14, further comprising
a hard drive base, wherein the disk pack is rotatably connected to the hard drive base; and
a gas duct in a hard drive top cover attached to the hard drive base.

16. The apparatus of claim 15, wherein the gas duct extends from the upwardly sloping gas channel to a location in the hard drive base away from the plurality of disks.

17. The apparatus of claim 14, further comprising a filter positioned between the gas chamber and the upwardly sloping gas channel.

18. The apparatus of claim 14, further comprising
a hard drive top cover in overlying contact with the gas chamber and the upwardly sloping gas channel; and
a gas duct in the hard drive top cover, wherein the gas duct extends along the circumferential span of the shroud and the upwardly sloping gas channel.

19. The apparatus of claim 18, wherein the hard drive top cover isolates the gas chamber from the gas duct.

20. The apparatus of claim 14, wherein the shroud is positioned less than 1.0 mm from the disk pack.

\* \* \* \* \*